United States Patent [19]
Bresowar

[11] Patent Number: 5,820,831
[45] Date of Patent: Oct. 13, 1998

[54] METHOD AND APPARATUS FOR PREPARING CALCIUM CARBONATE FOR SCRUBBING SULFUR OXIDES FROM COMBUSTION EFFLUENTS

[75] Inventor: Gerald E. Bresowar, Homewood, Ala., Sylvia M. Bresowar, legal representative

[73] Assignee: ABB Environmental Systems, Div. of ABB Flakt, Inc., Knoxville, Tenn.

[21] Appl. No.: 714,231

[22] Filed: Sep. 16, 1996

Related U.S. Application Data

[60] Division of Ser. No. 349,796, Dec. 6, 1994, Pat. No. 5,575,984, which is a continuation-in-part of Ser. No. 257,698, Jun. 9, 1994, Pat. No. 5,635,149.

[51] Int. Cl.[6] ................................................. B01D 50/00
[52] U.S. Cl. .................... 422/171; 422/170; 422/173; 422/177; 422/172
[58] Field of Search ................................. 422/170–172, 422/173, 177; 423/244.08

[56] References Cited

U.S. PATENT DOCUMENTS

| | | | |
|---|---|---|---|
| 4,018,868 | 4/1977 | Knight | 423/244.08 |
| 4,590,046 | 5/1986 | Edwall et al. | 423/244.08 |
| 4,710,365 | 12/1987 | Gebhard et al. | 423/244.08 |
| 4,713,226 | 12/1987 | Veltman | 423/244.08 |
| 5,215,672 | 6/1993 | Rogers et al. | 210/787 |
| 5,512,097 | 4/1996 | Emmer | 106/745 |

FOREIGN PATENT DOCUMENTS

| | | |
|---|---|---|
| 225349A | 7/1985 | German Dem. Rep. . |
| 3008718 | 9/1981 | Germany . |
| 3706533 | 1/1988 | Germany . |
| 62-282625 | 12/1987 | Japan . |

OTHER PUBLICATIONS

Jones, McIntuch, Lunden, Rhudy, Bowen, Mist Elimination System Design & Specification for EGD Systems, $SO_2$ Control Symposium, Boston, MA, Aug. 26, 1993.

Rader and Bakke, Incorporating Full–Scale Experience into Advanced Limestone Wet FGD Designs, IGCI Forum '91, Washington, D.C., Sep. 12, 1991.

Rosenberg and Koch, Report—Battelle's Stack Gas Emissions Control Coordination Center Group, Battelle Memorial Institute, Jul. 10, 1989.

*Primary Examiner*—Hien Tran
*Attorney, Agent, or Firm*—St.Onge Steward Johnston & Reenx

[57] ABSTRACT

Limestone is dried for grinding to very fine particles e.g., about $8\mu$ or less with more than 99% of the particle by weight less than $44\mu$, by utilizing waste heat from the flue gas from a large combustor. The finely-divided calcium carbonate is then introduced dry into a scrubbing tower where it mixes with and renews the slurry employed therein for scrubbing $SO_x$-laden effluent.

4 Claims, 3 Drawing Sheets

METHOD AND APPARATUS FOR PREPARING CALCIUM CARBONATE FOR SCRUBBING SULFUR OXIDES FROM COMBUSTION EFFLUENTS

RELATED APPLICATION

This application is a divisional of copending application Ser. No. 08/349,796, filed on Dec. 6, 1994, now U.S. Pat. No. 5,575,984, which is a continuation-in-part of copending, commonly-assigned U.S. patent application Ser. No. 08/257,698, now U.S. Pat. No. 5,635,149, entitled Improved Wet Scrubbing Method and Apparatus for Removing Sulfur Oxides from Combustion Effluents, filed Jun. 9, 1994, by Jonas S. Klingspor, Even Bakke, and Gerald E. Bresowar, the disclosure of which is incorporated by reference herein in its entirety.

TECHNICAL FIELD

The invention relates to improvements enabling the removal of sulfur oxides ($SO_x$) from combustion effluents with greater efficiency and economy. In particular, the invention improves flue gas desulfurization (FGD) by providing an improved method and apparatus for supplying finely-divided, dry limestone to a scrubbing tower.

The combustion of carbonaceous materials containing significant amounts of sulfur, including fossil fuels and waste, is being closely regulated by governments around the world. Combustion of these materials causes free radicals of sulfur and oxygen to combine at the elevated temperatures involved to produce a variety of oxides of sulfur—referred to as a group as $SO_x$. Reducing the amount of sulfur oxides released to the atmosphere is essential to alleviate the problems associated with acid rain.

Wet scrubbing with limestone slurries is an important technology for removing $SO_x$ from combustion effluents. Wet scrubbing utilizes gas-liquid contact to obtain a reaction between the gaseous, acidic $SO_x$ and the alkaline calcium carbonate which makes up the limestone. One preferred type of scrubber is of single-loop, open-tower design. These systems are the simplest in construction and operation, and are often preferred because they can be operated with low pressure drop and have a low tendency to scale or plug. The advantages of their simplicity and reliability have, with the invention described in the above copending application, been achieved in towers of reasonable size. Scrubbers of that type require the use of finely-ground limestone, e.g., from about 5 to about $8\mu$ mass median diameter with no less than about 99.5% of the particles below about $44\mu$.

Unfortunately, it is uneconomical to achieve the desired small particle size by grinding the calcium carbonate in water, as is the customary practice. Wet mills using balls or rods for grinding media are inefficient for achieving very small particle sizes when compared to dry grinding systems or pulverizers. However, dry pulverizers require some source of heat to dry the limestone ore during the grinding process, or else the pulverizer will not function properly. This invention addresses a novel and efficient approach to providing the required heat for drying from the flue gas scrubbing process.

BACKGROUND ART

Currently, most FGD processes utilize calcium carbonate prepared with ball mills operated in the "wet" mode. Because grinding takes place by action of falling balls in a limestone slurry, moisture in the coarse material before grinding is not a problem. However, this procedure is not efficient for achieving the particle sizes required for open towers of the type described by Klingspor, Bakke, and Bresowar.

It is known in other contexts that limestone can be efficiently ground to the desired fine particle sizes by grinding dry, such as in roller mills or pulverizers. However, as performed in the past, grinding dry to the desired particle size has required the use of auxiliary heat. This can add significantly to the processing costs. For example, natural gas or other like fuel must be burned in amounts sufficient to supply about 100,000 BTU's per ton of limestone processed. This translates into about 100 standard cubic feet (scf) of natural gas per ton of limestone and requires capital as well as operating costs. In addition to the costs, burning fuel to create the high temperatures necessary for drying can result in the generation of $NO_x$ which is another component of acid rain which must be controlled.

It would be desirable to achieve the benefits offered by dry grinding calcium carbonate for treating $SO_x$-laden combustion effluents, but eliminate the problem of producing additional air-borne pollutants and decrease the costs associated with the procedure.

DISCLOSURE OF THE INVENTION

It is an object of the invention to provide improved processes and apparatus for preparing finely-ground calcium carbonate in dry form for use in wet scrubbers to remove sulfur oxides from combustion effluents.

It is another object of a preferred embodiment of the invention to provide an improved process and apparatus for more economically and efficiently preparing finely-ground calcium carbonate in dry form.

It is a further object of the invention to enable the preparation of finely-ground, dry calcium carbonate with no need for additional fuel or burners to dry the calcium carbonate.

These and other objects are accomplished by the invention which provides both improved processes and apparatus for preparing finely-ground calcium carbonate in dry form to remove sulfur oxides in a wet scrubbing operation.

In one aspect, the process comprises: (a) dividing a flow of hot flue gas containing $SO_x$ from a combustor into at least a first flue gas stream and a second flue gas stream; (b) introducing the first flue gas stream into a scrubbing section within a scrubbing tower for contact with a slurry of finely divided calcium carbonate; (c) directing the second flue gas stream into contact with coarse calcium carbonate to dry the calcium carbonate to a moisture content suitable for dry-grinding; and (d) dry-grinding the coarse calcium carbonate, preferably to a weight median diameter of about $10\mu$ or less with at least about 99% by weight being less than about $44\mu$.

In a preferred embodiment, the second flue gas stream is contacted with the coarse calcium carbonate in a dry-grinding device and, following grinding and separation of the ground calcium carbonate from the second flue gas stream, a portion of the separated second flue gas stream, still having some drying capacity, is returned to the dry-grinding device. The balance of the second flue gas stream is combined with the first stream prior to both streams, now recombined, entering the scrubbing tower.

In another embodiment, the second flue gas stream is contacted with the coarse calcium carbonate in a dry-grinding device and, following grinding and separation of the ground calcium carbonate from the second flue gas stream, all of the second stream is combined with the first stream prior to both streams, now recombined, entering the scrubbing tower.

In still another embodiment, following division of the flue gas from the combustor into the first and second flue gas streams and contact of the second flue gas stream with the calcium carbonate, at least the first flue gas stream is brought into contact with a heat exchanger to transfer heat to effluent from the scrubbing tower.

In the more preferred embodiments, the median size of the calcium carbonate particles following grinding is in the range of from 5 to 8$\mu$, with 99.5% by weight of the particles being less than 44$\mu$.

The apparatus of the invention provides a system of unit operations effective for carrying out the process as described above.

BRIEF DESCRIPTION OF THE DRAWINGS

The invention will be better understood and its advantages will be better appreciated from the following detailed description, especially when read in light of the accompanying drawings, wherein.

INDUSTRIAL APPLICABILITY

The improvements of the invention have preferred application to wet scrubbing of combustion flue gases in open tower scrubbers which employ aqueous slurries of calcium carbonate to remove sulfur oxides, typically to an efficiency of 95% or more. The following description is centered on the preferred embodiment of FIG. 1 which is a single-loop, open-tower, countercurrent limestone wet scrubbing operation for removing sulfur oxides, principally as $SO_2$, from combustion effluents. However, application to other types of limestone wet scrubber gas contacting devices is not precluded. The Figures show a representative scrubber of this type, the details of which are described in the above-noted application of Klingspor, Bakke, and Bresowar, the disclosure of which is hereby incorporated by reference.

Limestone is the preferred form of calcium carbonate but can be replaced with another form, if desired. In addition to limestone, other forms of calcium carbonate include oyster shells, aragonite, calcite, chalk, marble, marl, and travertine. It can be mined or manufactured. In this description, the terms calcium carbonate and limestone are used interchangeably.

The limestone is finely divided, by grinding as described below, to achieve a weight median diameter of about 10$\mu$ or less, with 99% below 44$\mu$. This is extremely fine for wet scrubbing in an open tower with a countercurrent flow of limestone slurry. The more typical grind size of the prior art is a weight median diameter of 15$\mu$ or less with no more than 95% of the particles less than 44$\mu$. In further contrast to the prior art, it is noted that the preferred grinding process of the invention will yield particles with a weight median particle size of from about 5 to about 8$\mu$, with at least 99.5% by weight of the particles being less than 44$\mu$. The use of a grind of the preferred size has several advantages in open-tower, countercurrent wet scrubbing, and it is necessary to have a process which can efficiently produce the massive amounts of reagent necessary to facilitate the underlying environmental goals.

Figure 1:
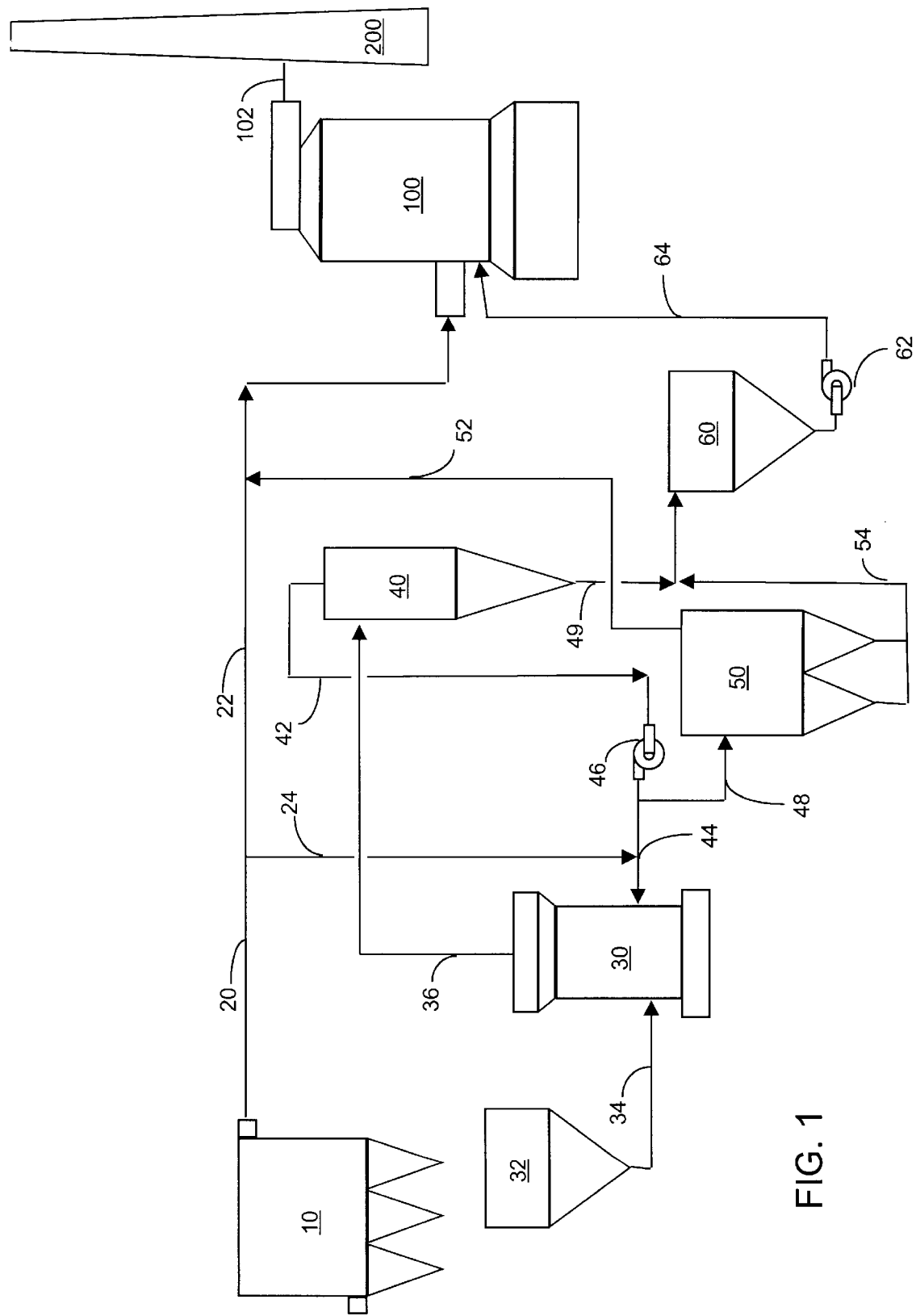
FIG. 1 is a schematic view of a preferred embodiment of the process and apparatus of the invention.

The preferred process arrangement of FIG. 1 shows an effluent, such as from a coal-fired industrial or utility boiler, entering a suitable means 10 for removing particulates, such as an electrostatic precipitator or fabric filter, which removes entrained solids to a practical extent. The cleaned flue gas is then passed via duct 20 which divides into two ducts 22 and 24. The flue gas is divided into a first flue gas stream in duct 22 and a second flue gas stream in duct 24. The first stream contains the vast majority of the flue gas, e.g., from about 92 to about 99.5% by volume, and is passed via duct 22 to wet scrubbing tower 100 wherein it is scrubbed with an aqueous slurry of finely-divided calcium carbonate, gypsum, calcium sulfite, and miscellaneous inert solids. The second flue gas stream is passed via duct 24 to a suitable dry-grinding device 30 wherein the drying capacity of the hot flue gas is employed to bring the moisture content of the calcium carbonate to the optimum level for grinding. Air may or may not be mixed with flue gas stream in duct 24 prior to entering device 30 to adjust the temperature or humidity of flue gas stream in duct 24 or the effluent stream in duct 36.

The dry-grinding device will be any of those capable of grinding calcium carbonate to achieve a weight median diameter of about 10$\mu$ or less, with 99% below 44$\mu$, and preferably to yield particles with a weight median particle size of from about 5 to about 8$\mu$, with at least 99.5% by weight of the particles being less than 44$\mu$. Typical of the suitable dry-grinding devices are dry roller mills, dry pulverizers, dry ball mills, and dry rod mills, where flue gas or air mixed with flue gas is used to dry the ore and convey the pulverized calcium carbonate out of the mill and through particle classification equipment. Dry pulverizers of the roller mill type are presently considered the best mode.

The second flue gas stream should preferably be employed at a temperature of from about 180° to about 500° F., typically from about 250° to about 350° F., and a relative humidity of less than about 5%, preferably less than about 1%. Where these conditions are met, and the moisture content of the coarse calcium carbonate is within the typical range of from about 2 to about 12%, the drying needs for a flue gas containing from about 300 to about 5,000 ppm sulfur oxides, can be effectively met by directing from about 0.5 to about 8% of the flue gas in duct 20 to duct 24. The chemically-free moisture content of the finely-divided calcium carbonate leaving the dry-grinding device 30 will typically be in the range of from about 0.01 to about 1% by weight, preferably less than about 0.5% by weight.

It is an advantage of the invention that the intense mixing of the flue gas with the calcium carbonate in the dry-grinding device 30 and downstream apparatus, will serve to reduce the sulfur oxides in this portion of the flue gas even before it reaches the scrubbing tower. Further, it is a special advantage that the sulfur trioxide form of sulfur oxide is substantially reduced or eliminated in device 30, thereby precluding any need to insulate the cyclone 40, baghouse 50, pump 46, or any of ducts 36, 44, or 42, and precluding any need to build any of these devices or conveyances out of corrosion-resistant alloys.

Coarse calcium carbonate, typically limestone ore in the form of crushed limestone, is held in bin 32 and passed to dry pulverizer 30 by a suitable conveyance line 34. Once the suitable grind sizes are achieved, the resulting fine particles of calcium carbonate are fed via duct 36 to a suitable separation device, such as cyclone 40, which separates much of the finely-divided calcium carbonate from the flue gas.

Figure 3:
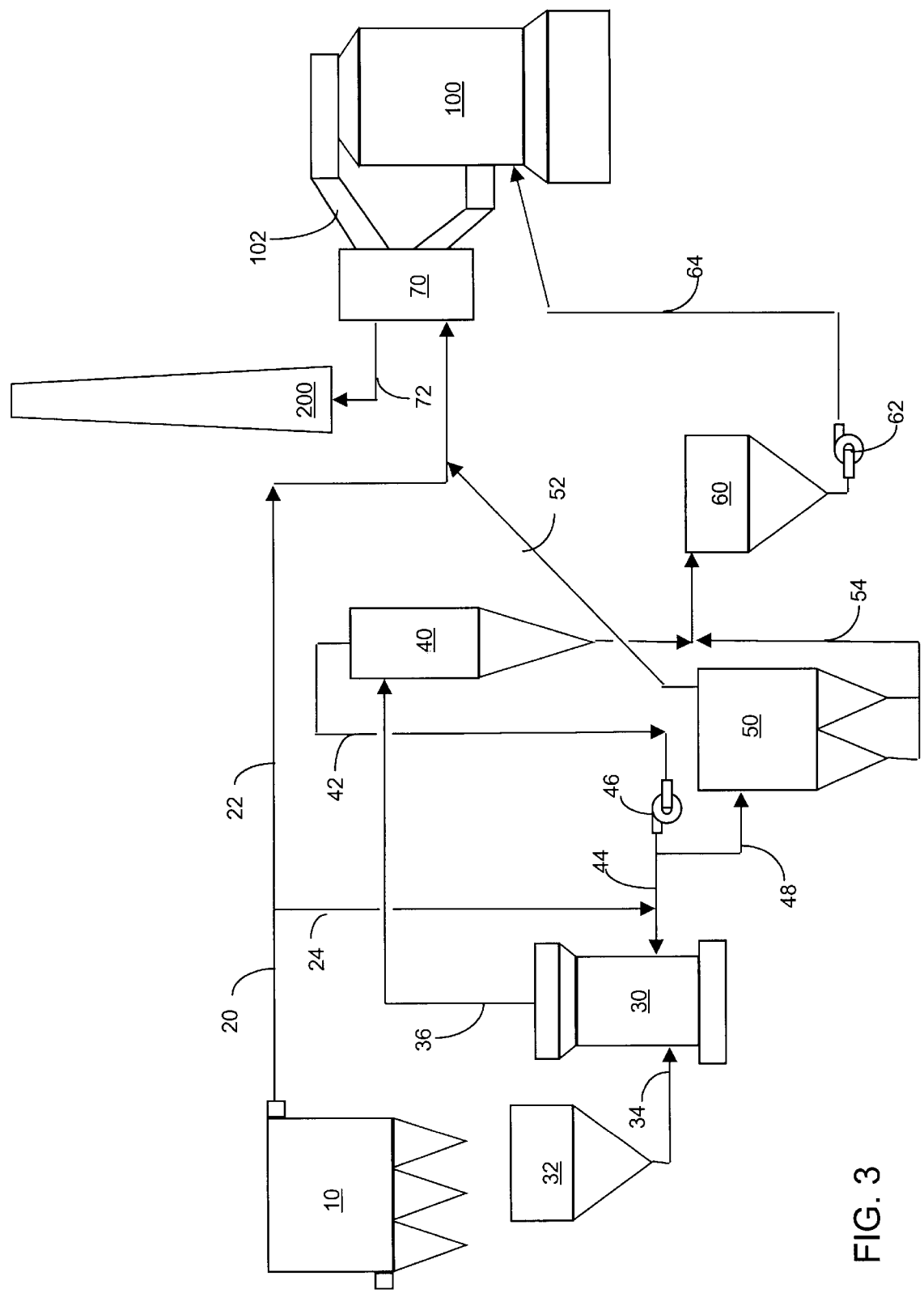
FIG. 3 is a schematic view of another embodiment of the process and apparatus of the invention.

FIGS. 1 and 3 show the majority of the flue gas being taken out of the cyclone overhead stream in duct 42, with a portion of it, still having some drying capacity, being returned via line or duct 44 to the dry-grinding device 30. In this case, pump 46 is helpful. As operating conditions require, a portion of the gas in line or duct 42 can be sent via line 48 to baghouse 50 and then directed via line 52 to be recombined with the first portion of flue gas in duct 22.

Finely-divided calcium carbonate is delivered from the baghouse 50 via line 54 and combined with a stream 49 of finely-divided calcium carbonate from the cyclone 40. The finely-divided calcium carbonate from both sources is stored in hopper 60. From hopper 60, the calcium carbonate is passed to the scrubber by suitable means including a pump 62 and line 64 for use in the scrubber 100.

Figure 2:
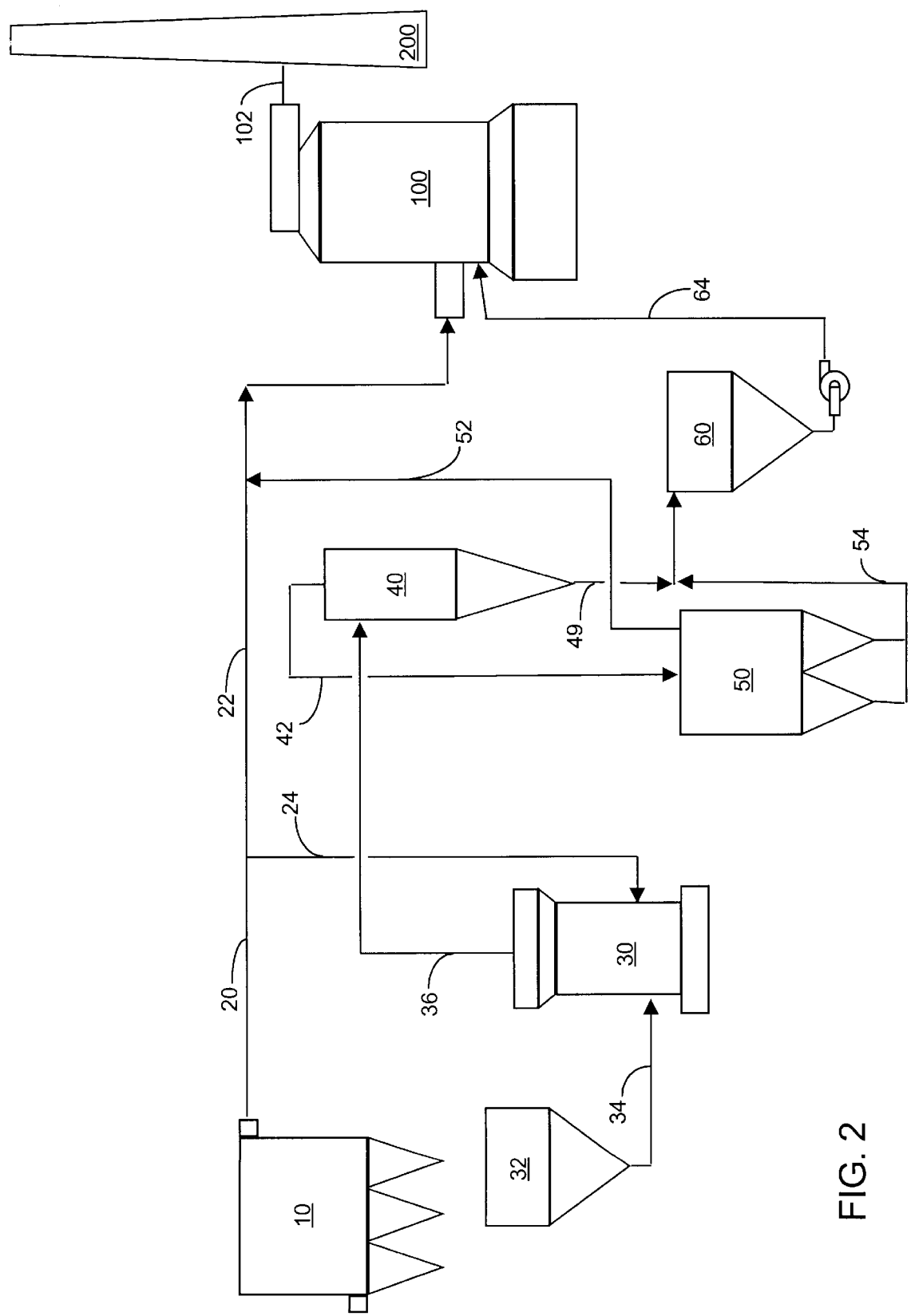
FIG. 2 is a schematic view of an alternative embodiment of the process and apparatus of the invention.

The embodiment of FIG. 2 does not recirculate any of the flue gas to the dry-grinding device 30 but, instead, passes it all via line 52 to duct 22.

The embodiment of FIG. 3 shows the use of a gas-to-gas heater 70, also known as a reheater. These devices may be of a recuperative or regenerative type or may be a tube or plate heat exchanger and operate, very generally, by transferring heat from the hotter gas stream in duct 22 to the colder gas stream in line 102. For example, a typical regenerative-type reheater employs a large disc that rotates between ducts carrying heat from one gas stream the other. In the specific embodiment of FIG. 3, incoming flue gas from the combustor is brought to the reheater 70 via duct 22. The heat in this portion of the flue gas is transferred to scrubber effluent from line 102 which passes through the reheater 70 prior to passing via line 72 to stack 200. The second flue gas stream recovered from the grinding operation, either as shown in FIG. 1 or in FIG. 2, is then passed to the scrubber. Because this second flue gas stream is relatively cool following grinding, it can be passed directly to the scrubber inlet or it can be blended directly with the stream in duct 22 ahead of reheater, such as via line 52 as shown in FIG. 3.

The flue gas is scrubbed in tower 100 by causing it to flow upwardly, countercurrent to a spray of an aqueous slurry which contains finely-divided limestone, gypsum, calcium sulfite, and miscellaneous inert solids discharged within a vertical scrubbing section within the tower as described in the aforementioned application of Jonas S. Klingspor, Even Bakke, and Gerald E. Bresowar. The finely-divided calcium carbonate is preferably introduced dry into a scrubbing tower where it mixes with and renews the slurry employed therein for scrubbing $SO_x$-laden effluent, but it is also permissible to pre-wet the finely-divided calcium carbonate to reduce dust carryover through tower 100.

The above description is for the purpose of teaching the person of ordinary skill in the art how to practice the invention, and it is not intended to detail all of those obvious modifications and variations of it which will become apparent to the skilled worker upon reading the description. It is intended, however, that all such obvious modifications and variations be included within the scope of the invention which is defined by the following claims. The claims are meant to cover the claimed elements and steps in any arrangement or sequence which is effective to meet the objectives there intended, unless the context specifically indicates the contrary.

It is claimed:

1. An apparatus for preparing finely-ground calcium carbonate in dry form to remove sulfur oxides from flue gases by wet scrubbing by contact of the flue gases with an aqueous slurry of calcium carbonate in a scrubbing tower, comprising:
    (a) first duct work arranged to divide a flow of flue gas containing $SO_x$ from a combustor into at least a first flue gas stream and a second flue gas stream;
    (b) second duct work arranged to introduce the first flue gas stream into a scrubbing section within a scrubbing tower for contact with an aqueous slurry of fine particles of calcium carbonate;
    (c) third duct work arranged to direct the second flue gas stream into contact with coarse calcium carbonate in a grinding means to dry the calcium carbonate in said grinding means to a moisture content suitable for dry-grinding;
    (d) said grinding means arranged to dry-grind the coarse calcium carbonate therein to a weight median diameter of about $8\mu$ or less with at least about 99% by weight being less than about $44\mu$; and
    (e) fourth duct work arranged to introduce the resulting dry, ground calcium carbonate and the second flue gas stream from the grinding means into the scrubbing tower.

2. An apparatus according to claim 1, wherein:
    means are provided in the fourth duct work for separation of the ground calcium carbonate from the second flue gas stream and for returning a portion of the separated second flue gas stream to the grinding means following grinding.

3. An apparatus according to claim 1, which further includes:
    a heat exchanger arranged in the second duct work to transfer heat from the first flue gas stream to effluent from the scrubbing tower.

4. An apparatus according to claim 1, wherein:
    grinding means for dry-grinding the coarse calcium carbonate comprise a dry pulverizer.

* * * * *